United States Patent
Shroni et al.

(10) Patent No.: US 8,707,019 B2
(45) Date of Patent: Apr. 22, 2014

(54) COMPONENT UPDATE USING MANAGEMENT ENGINE

(75) Inventors: Itamar Shroni, Modiin (IL); Nimrod Diamant, Kfar Saba (IL)

(73) Assignee: Intel Corporation, Santa Clara, CA (US)

(*) Notice: Subject to any disclaimer, the term of this patent is extended or adjusted under 35 U.S.C. 154(b) by 240 days.

(21) Appl. No.: 13/175,834

(22) Filed: Jul. 2, 2011

(65) Prior Publication Data

US 2013/0007437 A1 Jan. 3, 2013

(51) Int. Cl.
G06F 15/177 (2006.01)

(52) U.S. Cl.
USPC .............................. 713/2; 717/168

(58) Field of Classification Search
USPC .............................. 713/2; 717/168
See application file for complete search history.

(56) References Cited

U.S. PATENT DOCUMENTS

| | | | |
|---|---|---|---|
| 7,055,148 B2 | 5/2006 | Marsh et al. | |
| 7,219,343 B2 | 5/2007 | Almeida et al. | |
| 7,457,945 B2 | 11/2008 | Dailey et al. | |
| 7,917,743 B2 * | 3/2011 | Martinez et al. | 713/2 |
| 2010/0115256 A1 | 5/2010 | Challener et al. | |

FOREIGN PATENT DOCUMENTS

WO 2013006557 A2 1/2013

OTHER PUBLICATIONS

"DASH Implementation Requirements", Distributed Management Task Force, Inc. (DMTF), Document No. DSP0232, Version 1.1.0, Jun. 22, 2009, pp. 1-23.
"Parallel ATA", Wikipedia, The Free Encyclopedia, retreived on Oct. 11, 2011, 16 pages, Webpage available at: http://en.wikipedia.org/wiki/Parallel ATA.
Saint-Hilaire, Y., "Extreme Programming with Intel® vPro™ Technology: Pushing the Limits with Innovative Software", Intel Technology Journal, vol. 12, No. 4, Dec. 23, 2008, 10 pages.
"Intel Active Management Technology", Wikipedia, The Free Encyclopedia, retreived on Oct. 11, 2011, 10 pages Webpage available at: http://en.wikipedia.org/wiki/Intel Active Management Technology.
International Search Report and Written Opinion received for International Application No. PCT/US2012/045273, mailed Jan. 24, 2013, 10 pages.
International Preliminary Report on Patentability received for International Application No. PCT/US2012/1045273, mailed on Jan. 16, 2014, 7 pages.

* cited by examiner

*Primary Examiner* — Albert Wang
(74) *Attorney, Agent, or Firm* — Barnes & Thornburg LLP

(57) ABSTRACT

Embodiments of systems and methods for applying a component update using a management engine are disclosed. In some embodiments, the method may comprise storing a bootable image containing an update for a component of a computing device in a secured memory location and configuring the computing device to boot from the bootable image. Such configuration may include configuring the computing device for integrated device electronics redirection (IDE-R) to the bootable image.

25 Claims, 7 Drawing Sheets

COMPONENT UPDATE USING MANAGEMENT ENGINE

BACKGROUND

Most computing devices comprise firmware, which includes programs and data structures that control the internal device functions of components of the computing device. Firmware is often stored on flashable memory devices, such as erasable programmable read only memories (EPROMs). Utilizing a flashable memory device allows firmware to be updated by flashing over the memory device with new firmware, while preserving existing firmware when there is no power source available. The process of updating firmware may be referred to as a "component update," or a "platform update," where platform refers to one or more of the components of a computing device. During a firmware update, the component being updated must often be inoperable. As the component does not have access to its firmware, the component is incapable of performing its basic functions.

Many computing devices include firmware (or other software) that cannot be updated while the computing device is running its operating system (OS). By way of example, because the OS is typically stored on a hard disk drive and the hard disk drive is incapable retrieving data while its firmware is being updated, the computing device cannot administer a firmware update to the hard disk drive in the normal OS environment. Such firmware updates must be accomplished outside of the normal OS environment. Generally, this is accomplished by delivering a bootable image to the computing device. The bootable image may contain a stand-alone OS environment, such as a disk operating system (DOS) environment, that allows the computing device to operate and to apply the firmware update without accessing the normal OS environment.

Traditionally, bootable images used for such firmware updates had to be physically delivered to each computing device via a floppy disk, USB stick, or other portable media. Another known method of delivery is classic integrated device electronics redirect (IDE-R) in which a bootable image containing a firmware update is stored on a remote server. A computing device that has a network connection and is pre-configured to access the remote server may then boot from the remote bootable image to apply the firmware update.

BRIEF DESCRIPTION OF THE DRAWINGS

The invention described herein is illustrated by way of example and not by way of limitation in the accompanying drawings. For simplicity and clarity of illustration, elements illustrated in the drawings are not necessarily drawn to scale. For example, the dimensions of some elements may be exaggerated relative to other elements for clarity. Further, where considered appropriate, reference labels have been repeated among the drawings to indicate corresponding or analogous elements.

DETAILED DESCRIPTION OF THE DRAWINGS

Figure 1:
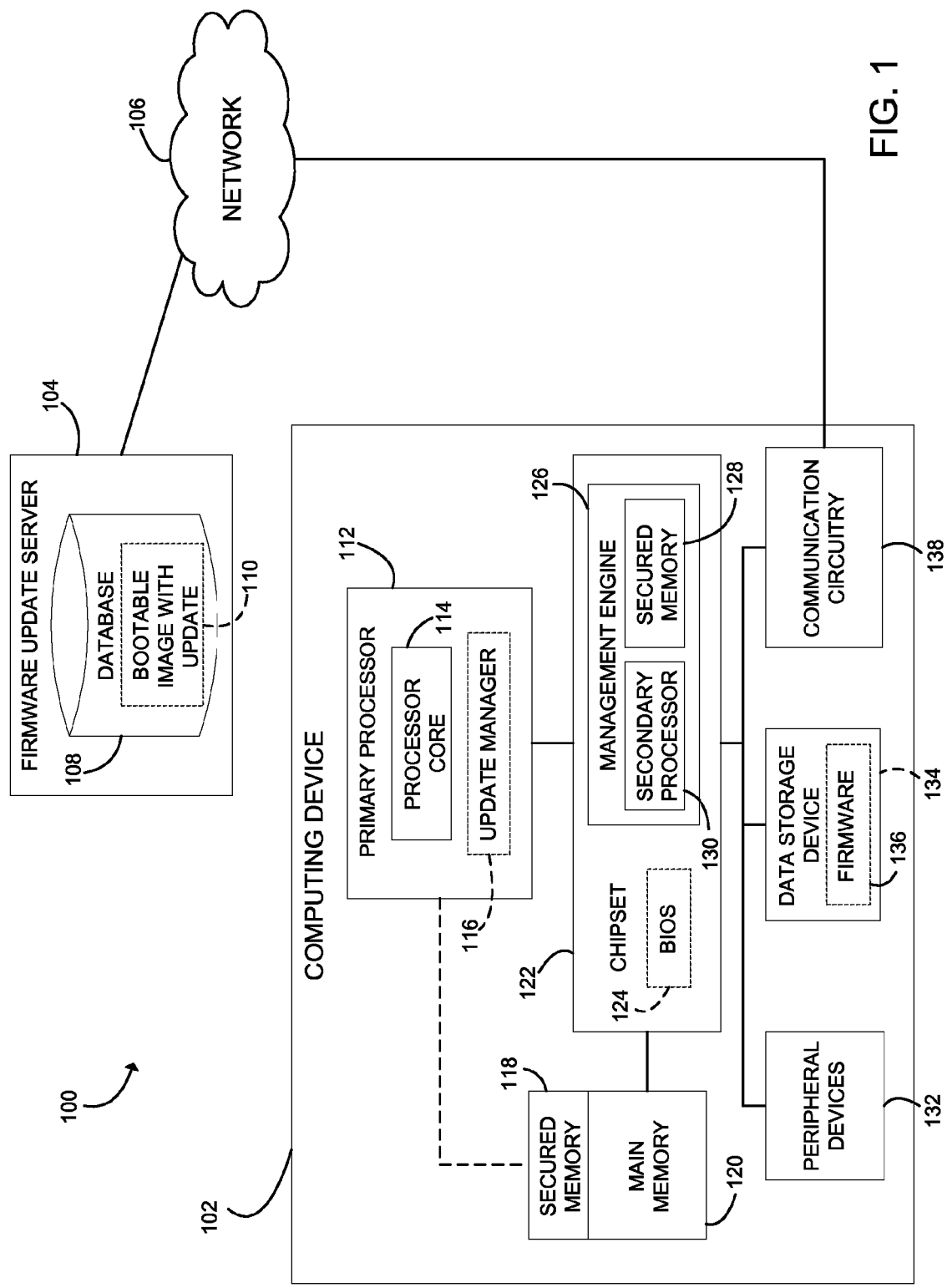
FIG. 1 is a simplified block diagram of one embodiment of a system configured to administer an update to a component of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an illustrative embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments of the invention may be implemented in hardware, firmware, software, or any combination thereof. Embodiments of the invention implemented in a computing device may include one or more bus-based interconnects between components and/or one or more point-to-point interconnects between components. Embodiments of the invention may also be implemented as instructions stored on one or more non-transitory, machine-readable media, which may be read and executed by one or more processors and/or controllers. A non-transitory, machine-readable medium may include any tangible mechanism for storing or transmitting information in a form readable by a machine (e.g., a computing device). For example, non-transitory, machine-readable media may include read only memory (ROM); random access memory (RAM); magnetic disk storage media; optical storage media; flash memory devices; and others.

Referring now to FIG. 1, a system 100 configured to administer an update to a component of a computing device 102 is shown. The system 100 includes the computing device 102, a firmware update server 104, and a network 106 that communicatively couples the computing device 102 to the firmware update server 104. The network 106 may be embodied as any type of wired and/or wireless network such as a local area network, a wide area network, a publicly available global network (e.g., the Internet), and/or other network. Additionally, the network 106 may include any number of additional devices to facilitate communication between the computing device 102 and the firmware update server 104, such as routers, switches, intervening computers, and the like.

The firmware update server 104 may be embodied as any type of computing device or computing devices separate from the computing device 102. For example, the firmware update server 104 may be embodied as one or more personal computers, workstations, laptop computers, handheld computers, mobile internet devices, cellular phones, personal data assistants, telephony devices, network appliances, virtualization devices, storage controllers, or other computer-based devices configured to communicate with the computing device 102 over the network 106. Although only one computing device 102 and one firmware update server 104 are illustratively shown in FIG. 1, the system 100 may include any number of computing devices 102 and any number of firmware update servers 104.

The firmware update server 104 may include or otherwise be communicatively coupled to a database 108. The database 108 may be embodied as data stored in a suitable data structure and location such as, for example, a relational database, a flat file database, or data stored in firmware update server memory (not shown). The database 108 comprises a bootable image 110 containing an update. In one illustrative embodiment, the bootable image 110 may contain a firmware update to be applied to a component of the computing device 102. In other embodiments, the bootable image 110 may contain multiple firmware updates to be applied to multiple components of the computing device 102. In still other embodiments, the bootable image 110 may additionally or alternatively contain a software update to be applied to the computing device 102.

The computing device 102 may be embodied as any type of electronic device capable of performing the functions described herein. For example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment of FIG. 1, the computing device 102 comprises a primary processor 112, a main memory 120, a chipset 122, one or more peripheral devices 132, a data storage device 134, and communication circuitry 138. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

The primary processor 112 of the computing device 102 may be embodied as any type of processor capable of executing software/firmware, such as a microprocessor, digital signal processor, microcontroller, or the like. The primary processor 112 is illustratively embodied as a single core processor having a processor core 114. However, in other embodiments, the in primary processor 112 may be embodied as a multi-core processor having multiple processor cores. Additionally, the computing device 102 may include additional primary processors 112 having one or more processor cores 114. The primary processor 112 is generally responsible for executing a software stack, which may include an OS and various applications, programs, libraries, and drivers resident on the computing device 102. As part of the software stack, the primary processor 112 may execute an update manager 116, which will be further described below with reference to FIG. 2.

The chipset 122 of the computing device 102 may include a memory controller hub (MCH or "northbridge"), an input/output controller hub (ICH or "southbridge"), and a firmware device. The firmware device may be embodied as a memory storage device for storing a Basic Input/Output System (BIOS) 124 and/or other information. However, in other embodiments, chipsets having other configurations may be used. For example, in some embodiments, the chipset 122 may be embodied as a platform controller hub (PCH). In such embodiments, the MCH may be incorporated in or otherwise associated with the primary processor 112, and the primary processor 112 may communicate directly with the main memory 120 (as shown by the hashed line in FIG. 1).

The processor 112 is communicatively coupled to the chipset 122 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The chipset 122 may also include a management engine 126, which is distinct from and generally operates independently of the primary processor 112. The management engine 126 may be embodied as any number of hardware, firmware, and/or software modules configured to perform security, encryption, and/or authentication functions, as described in more detail below. Although the management engine 126 is illustratively shown in FIG. 1 as being integrated into the chipset 122, the management engine 126 may additionally or alternatively include separate circuitry disposed on one or more expansion boards that are communicatively coupled to the chipset 122 via a number of signal paths. The management engine 126 may be communicatively coupled to various components of the computing device 102 (e.g., the primary processor 112, the main memory 120, etcetera) via the chipset 122 or, in other embodiments, via a number of independent signal paths.

In the illustrative embodiment of FIG. 1, the management engine 126 includes a secondary processor 130 that allows the management engine 126 to operate independently of the primary processor 112. The secondary processor 130 may be embodied as any type of processor capable of executing software/firmware, such as a microprocessor, digital signal processor, microcontroller, or the like, including one or more processors having one or more processor cores (not shown). In the illustrative embodiment, the management engine 126 also includes a secured memory 128, which is accessible to the secondary processor 130 but inaccessible to the primary processor 112. This secured memory 128 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other memory devices. The secured memory 128 may store various data, as well as software/firmware executable by the secondary processor 130. In some embodiments, the management engine 126 may also include additional built-in components, such as dedicated communication circuitry.

In some illustrative embodiments, the management engine 126 may be implemented using Intel® Active Management Technology (Intel® AMT), using a portion of Intel® AMT, using an Intel® Management Engine (Intel® ME), or using Intel® vPro™ Technology (Intel® vPro), all available from Intel Corporation of Santa Clara, Calif., and/or within chipsets sold by Intel Corporation. Intel AMT® embedded platform technology enables out-of-band access to hardware and software information stored in non-volatile memory on each endpoint device, eliminating the need for a functioning operating system and many of the software agents found in other management tools.

The main memory 120 of the computing device 102 may be embodied as one or more memory devices or data storage locations including, for example, DRAM, SDRAM, DDR SDRAM, flash memory devices, and/or other memory devices. The main memory 120 is communicatively coupled to the chipset 122 via a number of signal paths. Various data and software may be stored in the main memory 120. For example, one or more operating systems, applications, programs, libraries, and drivers that make up the software stack executed by the primary processor 112 may reside in the main memory 120 during execution. Furthermore, software and data stored in the main memory 120 may be swapped between the main memory 120 and the data storage device 134 as part of memory management operations.

In some embodiments, the main memory 120 may include a secured memory 118, which is accessible to the chipset 122 (including the management engine 126) but inaccessible to the primary processor 112. The secured memory 118 may be embodied as a portion of the main memory 120 that is isolated from the primary processor 112 by the chipset 122 using a memory isolation mechanism, preventing the ability of malicious software to access the secured memory 118. In some embodiments, the secured memory 118 may be embodied as an upper memory address (UMA). Where present, the secured memory 118 may be used as additional memory space for the management engine 126 (additionally or alternatively to secured memory 128).

The computing device 102 may also include one or more peripheral devices 132, a data storage device 134, and communication circuitry 138. In such embodiments, the chipset 122 is also communicatively coupled to the one or more peripheral devices 132, the data storage device 134, and the communication circuitry 138. The one or more peripheral devices 132 may include any number of peripheral devices including input devices, output devices, and other interface devices. For example, the peripheral devices 132 may include a display, mouse, keyboard, and external speakers of the computing device 102. The particular devices included in the peripheral devices 132 may depend upon, for example, the intended use of the computing device 102. The communication circuitry 138 may be embodied as any number of devices and circuitry for enabling communications between the computing device 102 and the firmware update server 104 over the network 106. For example, the communication circuitry 138 may be embodied as one or more wired and/or wireless network interface cards (NICs) or other network communication cards, modules, or circuits.

The data storage device 134 may be embodied as any type of device or devices configured for the short-term or long-term storage of data such as, for example, memory devices and circuits, memory cards, hard disk drives, solid-state drives, or other data storage devices. As shown in FIG. 1, the data storage device 134 comprises firmware 136 that controls the internal device functions of the data storage device 134 (e.g., the physical hardware manipulations required to read data off the data storage device 134). The firmware 136 may be the target of an update contained on the bootable image 110 discussed above. During an update to the firmware 136, data stored on the data storage device 134 may be inaccessible to other components of the computing device 102. Although the computing device 102 is illustrated as including only one data storage device 134, it will be appreciated that the computing device 102 may include any number of data storage devices 134, each comprising its own firmware 136.

In some illustrative embodiments of the computing device 102, requests by the primary processor 112 to retrieve data from the data storage device 134 may be handled using an integrated device electronics (IDE) bus (also sometimes referred to as an integrated drive electronics bus). In such embodiments, the management engine 126 may be configured to perform IDE redirection (IDE-R) on such requests. During IDE-R, the management engine 126 monitors the IDE bus of the chipset 122 and intercepts requests by the primary processor 112 to retrieve data from the data storage device 134. These requests may then be redirected to another memory device, including, but not limited to, the secured memory 118 or the secured memory 128. In still other embodiments, the management engine 126 may be configured to perform universal serial bus redirection (USB-R) in a similar manner.

Figure 2:
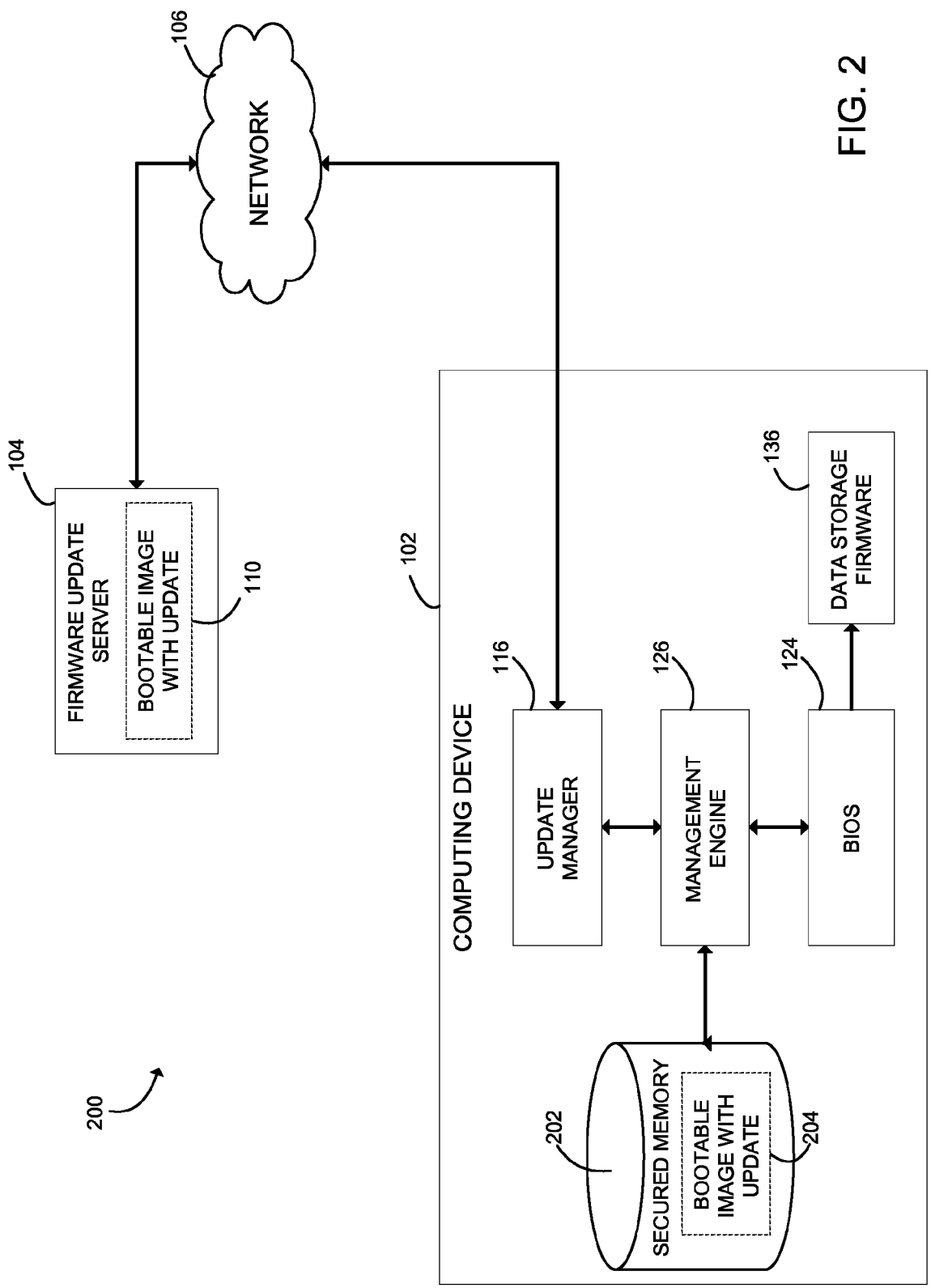
FIG. 2 is a simplified block diagram of one embodiment of a software environment of the computing device of FIG. 1.

Referring now to FIG. 2, a software environment 200 for administering an update to a component of a computing device 102 is illustrated. The software environment 200 includes software and firmware modules that are executed, stored, and/or transmitted on one or more of the computing device 102, the firmware update server 104, and the network 106. As such, the software environments of the computing device 102, of the firmware update server 104, and of the network 106 are illustrated in FIG. 2 (using the same reference numerals as FIG. 1). It will be appreciated that the software environment 200 may include other modules, applications, programs, and/or data, which are not illustrated in FIG. 2 for clarity of the description.

The software environment of the firmware update server 104 comprises a bootable image 110 containing an update. As discussed above, in some embodiments, the bootable image 110 may contain one or more firmware updates and/or software updates for the computing device 102. For example, the bootable image 110 may contain an update to the firmware 136 of the data storage device 134 of the computing device 102. The bootable image 110 may also include a stand-alone OS environment that is executable by the computing device 102 apart from a normal OS environment of the computing device 102. For instance, in some embodiments, the bootable image 110 may contain a disk operating system (DOS) environment or the like. Once the computing device 102 is operating in this stand-alone OS environment, the update may be installed on the appropriate component of the computing device 102 (e.g., the data storage device 134). As will be described in more detail below, the bootable image 110 containing the update may be digitally signed by the firmware update server 104 for security purposes. Several illustrative operations of the firmware update server 104 will be further described below with reference to FIG. 3.

The software environment of the computing device 102 comprises an update manager 116, a BIOS 124, a management engine 126, data storage firmware 136, and a secured memory 202. As discussed with reference to FIG. 1, the secured memory 202 may reside in a portion of the main memory 120 that forms the secured memory 118 and/or in the secured memory 128 that resides in the chipset 122. In either embodiment, the secured memory 202 is directly accessible to the management engine 126 (but not to other software/firmware modules of the software environment 200), as shown in FIG. 2.

The update manager 116 comprises a number of software/firmware modules that may be executed by the primary processor 112 of the computing device 102. Among other operations, the update manager 116 may communicate with the firmware update server 104 to determine whether an update for a component of the computing device 102 is available and, if so, to receive the bootable image 110 containing the update from the firmware update server 104. The update manager 116 may then provide the received bootable image 110 to the management engine 126. The update manager 116 may also be capable of requesting a reboot of the computing device 102 from the normal OS environment. In some embodiments, the update manager 116 may also communicate with the firmware update server 104 regarding whether the component update was successful. Several illustrative operations of the update manager 116 will be further described below with reference to FIG. 4.

As shown in FIG. 2, the management engine 126 comprises a number of software/firmware modules that may be executed by the secondary processor 130 of the computing device 102. As discussed above, the management engine 126 is capable of operating independently of the primary processor 112 of the computing device 102. Upon receiving a bootable image 110 containing an update from the update manager 116, the management engine 126 may store a local copy 204 of the bootable image 110 on the secured memory 202. In some embodiments, the management engine 126 may verify the authenticity of the received bootable image 110 and/or of the local copy 204 stored on the secured memory 202. The management engine 126 may configure the BIOS 124 to perform an IDE-R (or USB-R) boot and may mediate IDE-R (or USB-R) requests by retrieving data from the secured memory 202. The management engine 126 may also communicate with the update manager 116 to request a reboot of the computing device 102 and to inform the update manager 116 whether the component update was successful. Several illustrative operations of the management engine 126 will be further described below with reference to FIGS. 5A and 5B.

The BIOS 124 comprises a number of software/firmware modules that may be executed by the chipset 122 of the computing device 102. The BIOS 124 may be executed during each boot or reboot of the computing device 102 to initialize and identify components of the computing device 102 and to load an OS environment. For instance, during a normal boot sequence, the BIOS 124 may communicate with the firmware 136 of the data storage device 134 to load the normal OS environment. In response to one or more configuration parameters received from the management engine 126, however, the BIOS 124 may alternatively boot the computing device 102 from an IDE-R device or location. In such embodiments, the BIOS 124 may load the stand-alone OS environment of the bootable image 110 using the local copy 204 stored in the secured memory 202. Several illustrative operations of the BIOS 124 will be further described below with reference to FIG. 6.

Figure 3:
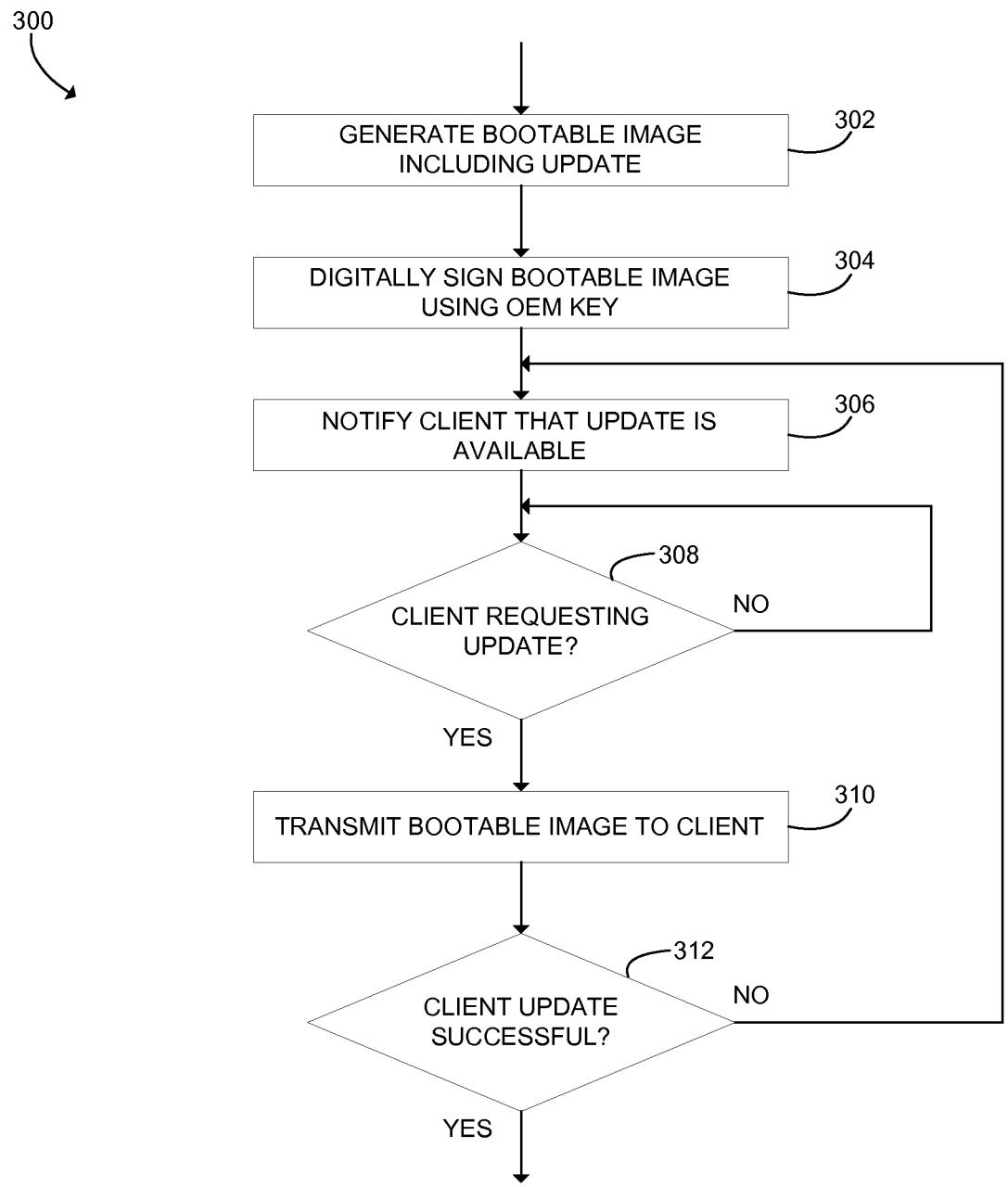
FIG. 3 is a simplified flow diagram of one embodiment of a method of packaging and delivering the bootable image using the update server of FIGS. 1 and 2.

Referring now to FIG. 3, a method 300 of packaging and delivering a bootable image 110 containing an update is illustrated as a simplified flow diagram. In some embodiments, the method 300 may involve the preparation of a bootable image 110 containing a firmware update for a data storage device 134 of a computing device 102. By way of example, an original equipment manufacturer (OEM) may utilize the method 300 to disseminate firmware updates for its components. The method 300 may be executed by, for example, the firmware update server 104, in conjunction with other components of the system 100, including the computing device 102.

The method 300 begins with block 302 in which the firmware update server 104 generates the bootable image 110 containing the update. The bootable image 110 containing the update may be generated by any known automatic or manual programming and/or compiling procedures. After the bootable image 110 has been created, the method 300 proceeds to block 304 in which the firmware update server 104 digitally signs the bootable image 110 using an OEM key. This OEM key allows a recipient of the bootable image 110 to verify that the bootable image 110 is authentic (as further described below). In some embodiments, the OEM key may be a Firmware Signing Key (FWSK) generated with a Rivest, Shamir, and Adleman (RSA) encryption algorithm.

After block 304, the method 300 proceeds to block 306 in which the firmware update server 104 notifies one or more computing devices 102 over the network 106 that an update is available. In some embodiments, block 306 may involve notifying all computing devices 102 that are connected to the network 106 that the update is available. After block 306, the method 300 proceeds to block 308 in which the firmware update server 104 awaits a response from one or more computing devices 102 indicating that one or more computing devices 102 are prepared to receive the update.

Once the firmware update server 104 receives a response from a computing device 102 in block 308, the method 300 proceeds to block 310 in which the firmware update server 104 transmits the bootable image 110 containing the update to the responding computer device 102 over the network 106. Once the bootable image 110 containing the update has been transmitted in block 310, the receiving computing device 102 will attempt to apply the update locally, as further described below with reference to FIGS. 4-6. After attempting to apply the update, the computing device 102 will transmit an appropriate message to the firmware update server 104 indicating whether the update was successfully applied to the targeted component of the computing device 102.

As such, after block 310, the method 300 proceeds to block 312 in which the firmware update server 104 awaits a response from the computing device 102 indicating whether the update was successfully applied. If the message indicates that the computing device 102 could not successfully apply the update, the method 300 returns to block 306 in which the firmware update server 104 re-notifies the computing device 102 that an update is available. Although FIG. 3 illustrates the method 300 for a single bootable image 110 containing an update, it is contemplated that the firmware update server 104 may simultaneously package and deliver multiple bootable images 110 to one or more computing devices 102.

Figure 4:
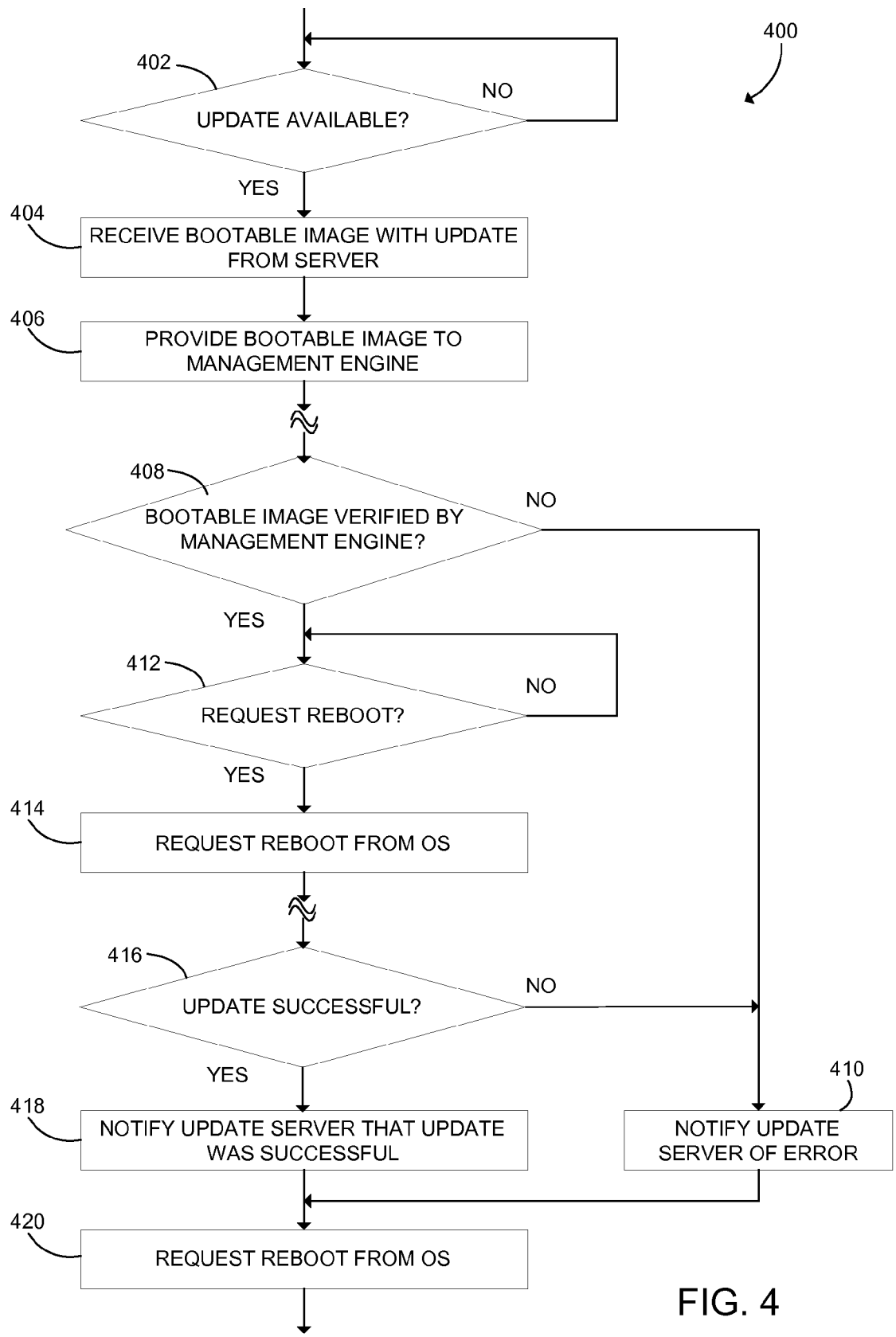
FIG. 4 is a simplified flow diagram of one embodiment of a method of administering the update using the update manager of FIGS. 1 and 2.

Referring now to FIG. 4, a method 400 of administering an update contained in a bootable image 110 is illustrated as a simplified flow diagram. In general, the method 400 involves receiving the bootable image 110 from the firmware update server 104, providing the bootable image 110 to the management engine 126, and rebooting the computing device 102 as requested by the management engine 126. In some embodiments, the method 400 may also involve providing feedback to the firmware update server 104 on whether the update was successfully applied. The method 400 may be executed by, for example, the update manager 116, in conjunction with other components of the computing device 102, which may interact with other components of the system 100.

The method 400 begins with block 402 in which the update manager 116 awaits notification from the firmware update server 104 via network 106 that an update is available. Upon receiving a notification that an update is available, the update manager 116 may determine whether the update is applicable to a component of the computing device 102 and whether computing device 102 is prepared to receive the update. Where these conditions are met, the update manager 116 provides a notification to the firmware update server 104 that it is ready to receive the bootable image 110 containing the update.

After block 402, the method 400 proceeds to block 404 in which the update manager 116 receives the bootable image 110 containing the update from the firmware update server 104 over the network 106. In some embodiments, upon receiving the bootable image 110 in block 404, the update manager 116 may store the bootable image 110 in the main memory 120 and/or the data storage device 134. After the bootable image 110 containing the update is received in block 404, the method 400 (as well as the method 500 of FIGS. 5A-B and the method 600 of FIG. 6) may proceed irrespective of the ability of the computing device 102 to communicate with the firmware update server 104 over the network 106. In other words, besides the optional provision of feedback to the firmware update server 104 (e.g., in blocks 410 and 418, discussed below), the computing device 102 may apply the update without further communication with the firmware update server 104.

After block 404, the method 400 proceeds to block 406 in which the update manager 116 provides the bootable image 110 containing the update to the management engine 126. Once the bootable image 110 has been provided to the management engine 126 in block 406, the management engine 126 will attempt to verify the authenticity of the bootable image 110, store a local copy 204 of the bootable image 110 in secured memory 202, configure the BIOS 124 for an IDE-R boot, and request a reboot of the computing device 102, as further described below with reference to FIG. 5A.

After block 406, the method 400 proceeds to block 408 in which the update manager 116 awaits a notification from the management engine 126 regarding whether the authenticity of the bootable image 110 containing the update has been verified. If the bootable image 110 cannot be verified and the management engine 126 returns an error to the update manager 116, the method 400 proceeds to block 410. In block 410, the update manager 116 notifies the firmware update server 104 that the update was not successfully applied (provided that the computing device 102 is capable of communicating with the firmware update server 104 over the network 106 at that time). After notifying the firmware update server 104 in block 410 of the unsuccessful attempt to apply the update, the method 400 may proceed to block 420 in which the update manager 116 requests a warm reboot from the OS presently running on the computing device 102.

If, during block 408, the update manager 116 instead receives a message from the management engine 126 indicating that the bootable image 110 has been verified, the method 400 proceeds to block 412 (rather than block 410). In block 412, the update manager 116 awaits a request from the management engine 126 to reboot the computing device 102. Once such a request is received from the management engine 126, the method 400 proceeds to block 414 in which the update manager 116 requests a warm reboot from the OS presently running on the computing device 102. After the reboot in block 414 (assuming the management engine 126 has configured the BIOS 124 for an IDE-R boot), the management engine 126 will verify the authenticity of the local copy 204 of the bootable image 110, mediate IDE-R requests to the secured memory 202, and inform the update manager 116 whether the update was successfully applied, as further described below with reference to FIG. 5B.

After block 414, the method 400 proceeds to block 416 in which the update manager 116 awaits a notification from the management engine 126 regarding whether the update was successfully applied. If the management engine 126 returns an error to the update manager 116, the method 400 proceeds to block 410. In block 410, the update manager 116 notifies the firmware update server 104 that the update was not successfully applied (provided that the computing device 102 is capable of communicating with the firmware update server 104 over the network 106 at that time). After notifying the firmware update server 104 in block 410 of the unsuccessful attempt to apply the update, the method 400 may proceed to block 420 in which the update manager 116 requests a warm reboot from the OS presently running on the computing device 102.

If, during block 416, the update manager 116 instead receives a message from the management engine 126 indicating that the update was successfully applied, the method 400 proceeds to block 418 (rather than block 410). In block 418, the update manager 116 notifies the firmware update server 104 that the update was successfully applied (provided that the computing device 102 is capable of communicating with the firmware update server 104 over the network 106 at that time). After notifying the firmware update server 104 in block 418 of the successful attempt to apply the update, the method 400 may proceed to block 420 in which the update manager 116 requests a warm reboot from the OS presently running on the computing device 102.

Figure 5A:
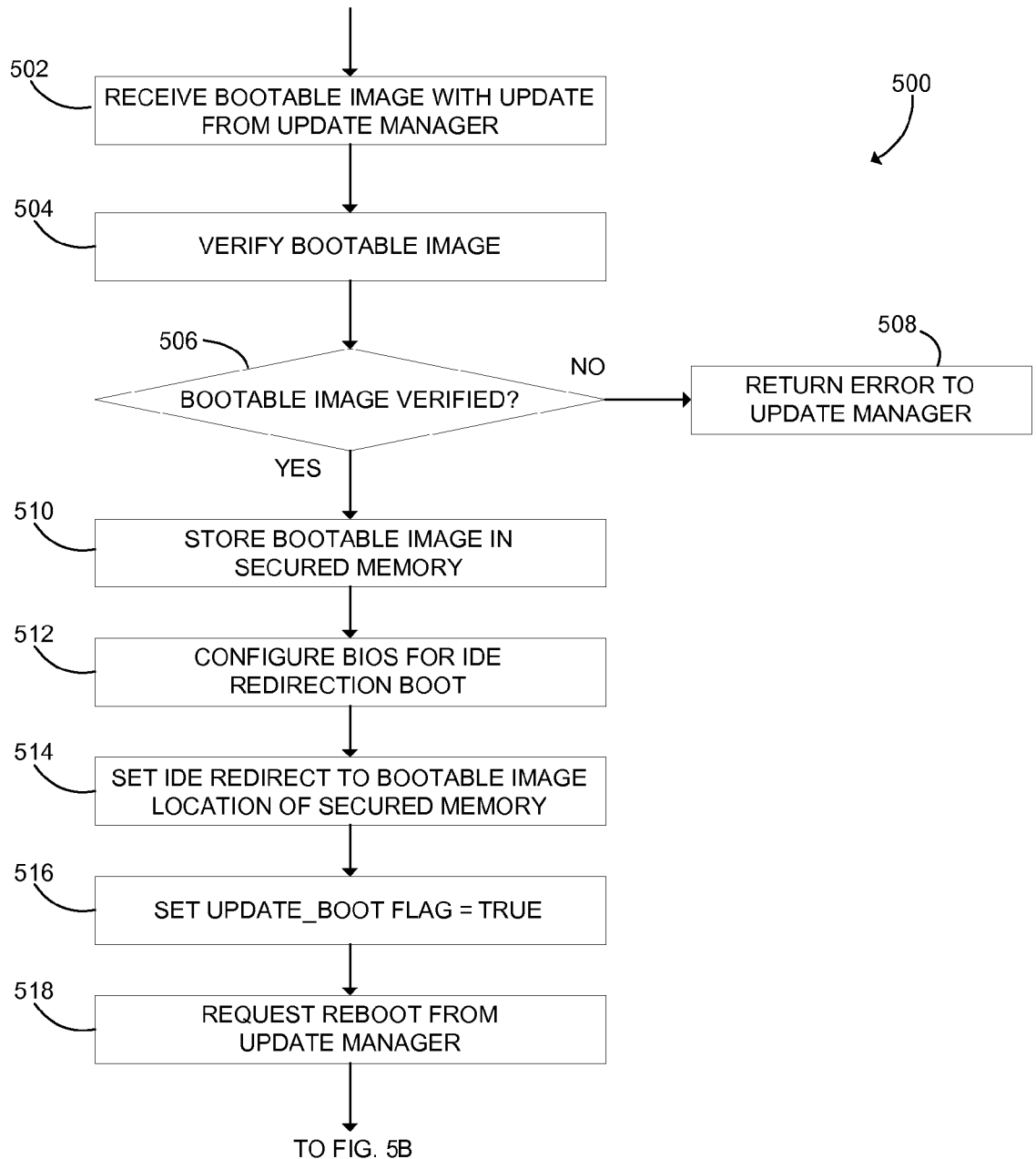
FIGS. 5A and 5B are simplified flow diagrams of one embodiment of a method of applying the update using the management engine of FIGS. 1 and 2.
Figure 5B:
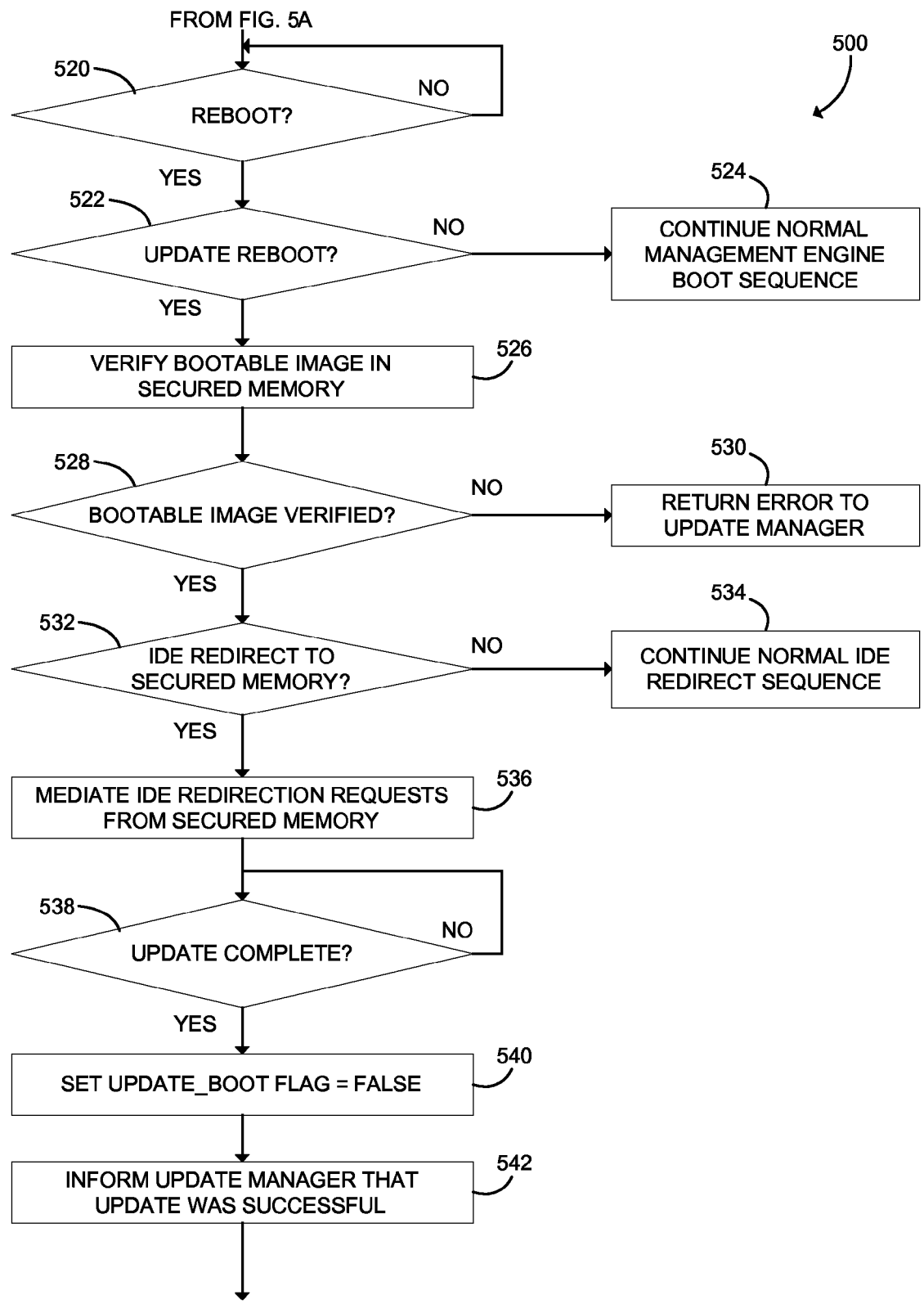

Referring now to FIGS. 5A and 5B, a method 500 of applying an update contained in a bootable image 110 is illustrated as a simplified flow diagram. In general, the portion of method 500 shown in FIG. 5A involves verifying the authenticity of the bootable image 110, storing a local copy 204 of the bootable image 110 in secured memory 202, configuring the BIOS 124 for an IDE-R boot, and requesting a reboot of the computing device 102. In general, the portion of method 500 shown in FIG. 5B involves verifying the authenticity of the local copy 204 of the bootable image 110, mediating IDE-R requests to the secured memory 202, and informing the update manager 116 whether the update was successfully applied. The method 500 may be executed by, for example, the management engine 126, in conjunction with other components of the computing device 102, which may interact with other components of the system 100.

The method 500 begins with block 502 in which the management engine 126 receives the bootable image 110 containing the update from the update manager 116 (as discussed above with reference to block 406 of the method 400). After receiving the bootable image 110 in block 502, the method 500 proceeds to block 504 in which the management engine 126 verifies the authenticity of the bootable image 110. In some embodiments, block 504 may involve the management engine 126 verifying an OEM key digitally signed on the bootable image 110 using encryption/decryption key(s) stored in the management engine 126 (e.g., stored in the secured memory 128).

After block 504, the method 500 proceeds to block 506 in which the management engine 126 determines whether to proceed with applying the update contained in the bootable image 110. If the authenticity of the bootable image 110 was not verified in block 504, the method 500 proceeds to block 508 in which the management engine 126 sends a message to the update manager 116 indicating that the bootable image 110 has not been verified. If, during block 506, the management engine 126 instead determines that the authenticity of the bootable image 110 has been verified, the method 500 proceeds to block 510 (rather than block 508), and the management engine 126 sends a message to the update manager 116 indicating that the bootable image 110 has been verified.

In block 510, the management engine 126 stores a local copy 204 of the bootable image 110 containing the update in a secured memory 202. As discussed above, in some embodiments, block 510 may involve the management engine 126 storing a local copy 204 of the bootable image 110 in a portion of the main memory 120 that forms the secured memory 118 and/or in the secured memory 128 that resides in the chipset 122.

After block 510, the method 500 proceeds to block 512 in which the management engine 126 may configure the BIOS 124 to conduct an IDE-R boot. In some embodiments, block 512 may involve the management engine 126 setting one or more configuration parameters of the BIOS 124 to boot the computing device 102 from an IDE-R device or location. After block 512, the method 500 proceeds to block 514 in which the management engine 126 sets one or more internal parameters such that the location of the next IDE-R boot is the portion of the secured memory 202 storing the local copy 204 of the bootable image 110 (rather than a location of a remote drive on the network 106). After block 514, the method 500 proceeds to block 516 in which the management engine 126 sets an internal flag (e.g., "UPDATE_BOOT") to inform itself upon the next boot that a firmware update is to be applied. Blocks 512-516 have the combined effect of configuring the BIOS 124 and the management engine 126 to execute the local copy 204 of the bootable image 110, and apply the update contained therein, upon the next boot of the computing device 102. After block 516, the method 500 proceeds to block 518 in which the management engine 126 requests a warm reboot from the update manager 116 (as discussed above with reference to block 412 of the method 400).

The method 500 continues, as shown in FIG. 5B, with block 520 in which the management engine 126 awaits a reboot of the computing device 102 by the update manager 116 (as discussed above with reference to block 414 of the method 400). Upon a reboot of the computing device 102, the method 500 proceeds to block 522 in which the management engine 126 determines whether a firmware update is to be applied during the present boot. In some embodiments, block 522 may involve the management engine 126 determining whether an internal flag (e.g., "UPDATE_BOOT") is set. If, during block 522, the management engine 126 determines that no update is ready to be applied, the method 500 proceeds to block 524 in which the management engine 126 continues its normal boot sequence. If, during block 522, the management engine 126 instead determines that an update is ready to be applied, the method 500 proceeds to block 526 (rather than block 524).

During block 526, the management engine 126 verifies the authenticity of the local copy 204 of the bootable image 110 stored in the secured memory 202. In some embodiments, block 526 may involve the management engine 126 verifying an OEM key digitally signed on the local copy 204 of the bootable image 110. After block 526, the method 500 proceeds to block 528 in which the management engine 126 determines whether to proceed with applying the update contained in the local copy 204 of the bootable image 110. If the authenticity of the local copy 204 was not verified in block 526, the method 500 proceeds to block 530 in which the management engine 126 sends a message to the update manager 116 indicating that the bootable image 110 has not been verified. If, during block 528, the management engine 126 instead determines that the authenticity of the local copy 204 has been verified, the method 500 proceeds to block 532 (rather than block 530), and the management engine 126 sends a message to the update manager 116 indicating that the local copy 204 of the bootable image 110 has been verified.

During block 532, the management engine 126 checks the one or more internal parameters set in block 514 to determine whether IDE-R requests during the present boot should be directed to the secured memory 202 storing the local copy 204 of the bootable image 110 or a remote drive on the network 106. If, during block 532, the management engine 126 determines that IDE-R requests should be sent to a remote drive, the method 500 proceeds to block 534 in which the management engine 126 performs a classical IDE-R sequence (i.e., redirecting IDE bus read requests to a remote drive on the network 106). If, during block 532, the management engine 126 instead determines that IDE-R requests should be directed locally to the secured memory 202, the method 500 proceeds to block 536 (rather than block 534).

During block 536, the management engine 126 mediates the IDE-R sequence by redirecting IDE bus read requests from the BIOS 124 and/or the primary processor 112 of the computing device 102 to the local copy 204 of the bootable image 110 stored on the secured memory 202. Using this procedure, the primary processor 112 applies the update contained in the local copy 204 of bootable image 110 during block 536. In one illustrative embodiment, booting from the local copy 204 of the bootable image 110 may allow the primary processor 112 to update the firmware 136 of the data storage device 134. As shown in block 538, the management engine 126 simultaneously monitors the progress of block 536 to determine when the update has been applied.

After the management engine 126 determines that the update is complete in block 538, the method 500 proceeds to block 540 in which the management engine 126 resets an internal flag (e.g., "UPDATE_BOOT") to inform itself upon the next boot that the firmware update has already been applied. In some embodiments of the method 500, block 540 may also involve the management engine 126 invalidating the bootable image 110 to prevent the update from being applied to the computing device 102 again on a subsequent boot. After block 540, the method 500 proceeds to block 542 in which the management engine 126 sends a message from the update manager 116 indicating that the update was successfully applied (as discussed above with reference to block 416 of the method 400).

Figure 6:
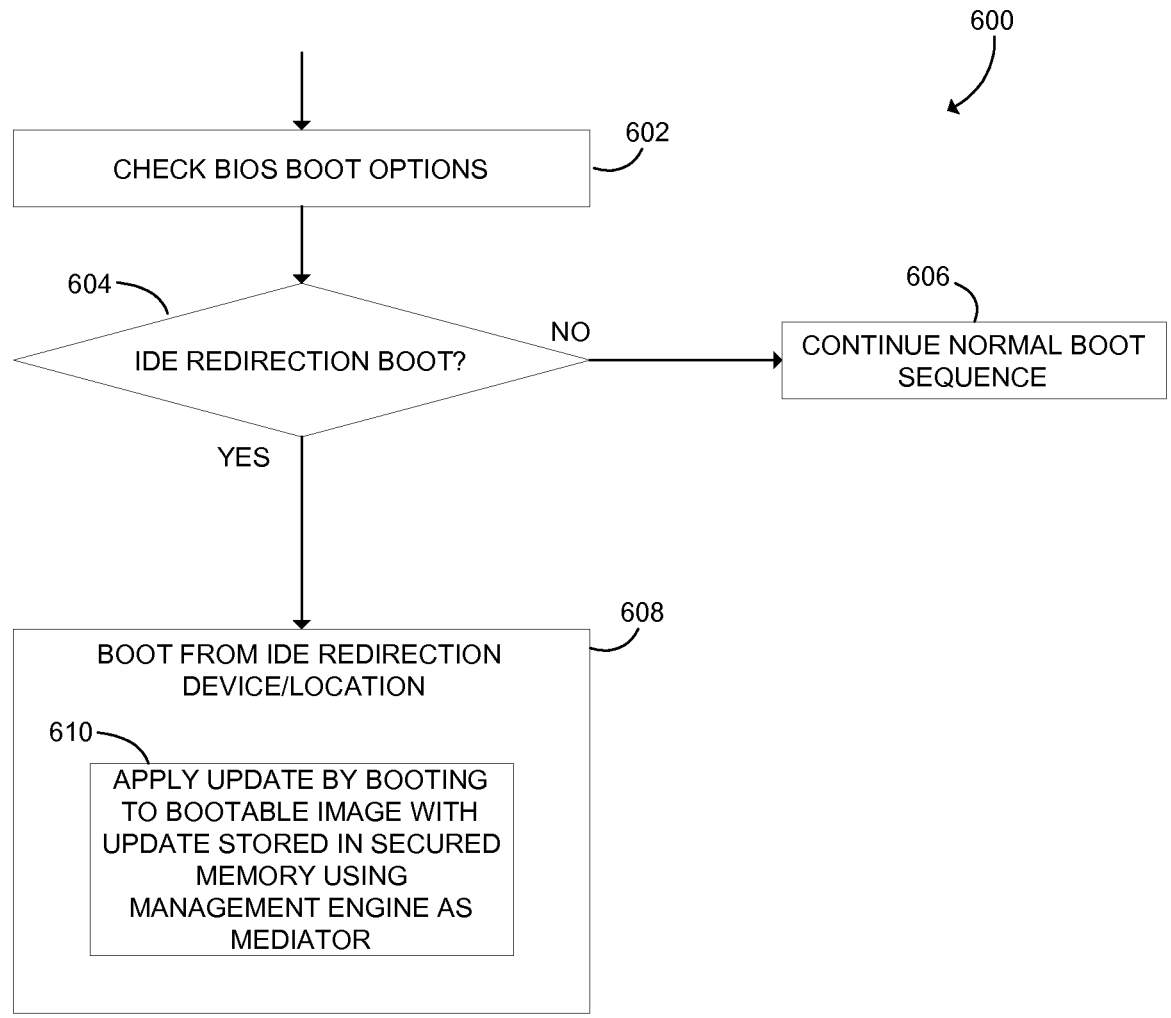
FIG. 6 is a simplified flow diagram of one embodiment of a method of booting the computing device using the Basic Input/Output System (BIOS) of FIGS. 1 and 2.

Referring now to FIG. 6, a method 600 of booting the computing device 102 is illustrated as a simplified flow diagram. In general, the method 600 involves determining whether the present boot of a computing device 102 should be an IDE-R boot and booting the computing device 102 according to the appropriate boot sequence. The method 600 may be executed by, for example, the BIOS 124, in conjunction with other components of the computing device 102, which may interact with other components of the system 100.

The method 600 begins at block 602 in which the BIOS 124 checks one or more of its configuration parameters that indicate whether the present boot of the computing device 102 should be from an IDE-R device or location. As discussed above (with reference to block 512 of the method 500), the management engine 126 may set one or more configuration parameters of the BIOS 124 to indicate that an IDE-R boot should be performed. After block 602, the method 600 proceeds to block 604 in which the BIOS 124 determines whether to proceed with a normal boot sequence or an IDE-R boot sequence. If the one or more configuration parameters checked in block 602 do not indicate that an IDE-R boot should be performed, the method 600 proceeds to block 606 in which a normal boot sequence is performed by the BIOS 124 (e.g., the BIOS 124 loads the normal OS environment from the data storage device 134). If, during block 604, the BIOS 124 instead determines that the present boot of the computing device 102 should be from an IDE-R device or location, the method 600 proceeds to block 608 (rather than block 606).

During block 608, the BIOS 124 will send read requests to the management engine 126, which will redirect these read requests to the appropriate IDE-R device or location, based upon its own internal parameters. Where the management engine 126 is configured to redirect IDE-R requests from the BIOS 124 to the local copy 204 of the bootable image 110 stored in the secured memory 202 (as discussed above with reference to block 536 of the method 500), the method 600 will include block 610. In these situations, the BIOS 124 will boot the computing device 102 using the local copy 204 of the bootable image 110 containing the update to be applied to the computing device 102. In response to being executed, the bootable image 110 applies the update to the respective component of the computing device 102. In some embodiments, the bootable image may include an instruction to cause the computing device 102 to reboot upon successfully completion of the update. In such embodiments, the update manager 116 may not request the reboot upon successful completion of the update (i.e., block 420 of method 400 may not be executed by the update manager 116).

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   receiving, on a computing device, a bootable image containing an update for a component of the computing device;
   storing the bootable image in a local, secured memory location of the computing device;
   configuring the computing device to boot from the bootable image;
   rebooting the computing device; and
   applying the update to the component in response to the rebooting of the computing device.

2. The method of claim 1, wherein receiving the bootable image comprises receiving a digitally-signed bootable image from an update server.

3. The method of claim 2, further comprising verifying that the bootable image has been digitally signed by the update server prior to storing the bootable image.

4. The method of claim 1, wherein storing the bootable image comprises storing the bootable image in a dedicated memory location of a management engine of the computing device, the dedicated memory location being inaccessible by a primary processor of the computing device.

5. The method of claim 1, wherein storing the bootable image comprises storing the bootable image in an upper memory area (UMA) location.

6. The method of claim 5, wherein storing the bootable image in an upper memory area (UMA) location comprises storing the bootable image in an UMA location of a main memory of the computing device.

7. The method of claim 1, wherein configuring the computing device to boot from the bootable image comprises configuring a basic input/output system (BIOS) of the computing device for integrated device electronics redirection (IDE-R).

8. The method of claim 7, wherein applying the update to the component comprises responding to IDE-R requests using the bootable image.

9. The method of claim 8, wherein responding to the IDE-R requests comprises receiving IDE-R requests from the BIOS with a management engine of the computing device and responding to the IDE-R requests, with the management engine, with data of the bootable image.

10. The method of claim 1, wherein applying the update to the component comprises:
    receiving integrated device electronics redirection (IDE-R) requests with a management engine of the computing device; and
    responding to the IDE-R requests using the bootable image.

11. The method of claim 1, wherein applying the update to the component comprises updating a firmware of the component.

12. The method of claim 1, wherein applying the update to the component comprises applying the update to a hard disk drive.

13. The method of claim 1, further comprising indicating the bootable image as invalid after the update has been applied to the component.

14. One or more non-transitory, machine readable media comprising a plurality of instructions that in response to being executed result in a computing device:
    storing a bootable image in a local, secured memory location of the computing device, the bootable image containing an update for a component of the computing device;
    configuring the computing device to boot from the bootable image;
    rebooting the computing device using the bootable image; and
    applying the update to the component in response to the rebooting of the computing device.

15. The one or more non-transitory, machine readable media of claim 14, wherein configuring the computing device to boot from the bootable image comprises configuring a basic input/output system (BIOS) of the computing device for integrated device electronics redirection (IDE-R).

16. The one or more non-transitory, machine readable media of claim 15, wherein applying the update to the component comprises responding to IDE-R requests using the bootable image.

17. The one or more non-transitory, machine readable media of claim 16, wherein responding to the IDE-R requests comprises receiving IDE-R requests from the BIOS with a management engine of the computing device and responding to the IDE-R requests, with the management engine, with data of the bootable image.

18. The one or more non-transitory, machine readable media of claim 14, wherein applying the update to the component comprises:
    receiving integrated device electronics redirection (IDE-R) requests with a management engine of the computing device; and
    responding to the IDE-R requests using the bootable image.

19. The one or more non-transitory, machine readable media of claim 14, wherein applying the update to the component comprises updating a firmware of the component.

20. The one or more non-transitory, machine readable media of claim 14, wherein applying the update to the component comprises applying the update to a hard disk drive.

21. A computing device comprising:
a boot device;
a primary processor to make boot requests to the boot device;
a local memory device having a secured memory location, a bootable image containing an update for a component of the computing device being stored in the secured memory location; and
a management engine including a secondary processor, the management engine to apply the update by redirecting the boot requests of the primary processor from the boot device to the bootable image.

22. The computing device of claim 21, wherein to apply the update comprises to configure a basic input/output system (BIOS) of the computing device for integrated device electronics redirection (IDE-R).

23. The computing device of claim 21, wherein the boot device is a hard disk drive and the update is an update to a firmware of the hard disk drive.

24. The computing device of claim 21, wherein the management engine comprises a management engine to validate the bootable image prior to applying the update by verifying that the bootable image has been digitally signed by an authorized entity.

25. The computing device of claim 21, wherein the management engine comprises a management engine to indicate the bootable image as invalid in response to the update being applied.

* * * * *